(12) United States Patent
Narasimalu

(10) Patent No.: US 7,922,450 B2
(45) Date of Patent: Apr. 12, 2011

(54) WIND TURBINE BLADE COMPRISING A TRAILING EDGE FLAP AND A PIEZOELECTRIC ACTUATOR

(75) Inventor: Srikanth Narasimalu, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/730,810

(22) Filed: Mar. 24, 2010

(65) Prior Publication Data

US 2010/0247314 A1 Sep. 30, 2010

Related U.S. Application Data

(60) Provisional application No. 61/163,663, filed on Mar. 26, 2009.

(30) Foreign Application Priority Data

Mar. 26, 2009 (DK) .................................. 2009 00420

(51) Int. Cl.
*B64C 27/615* (2006.01)
*B64C 9/00* (2006.01)

(52) U.S. Cl. ...................................... 416/23; 416/132 B

(58) Field of Classification Search .................... 416/23, 416/24, 88, 89, 132 B, 146 R
See application file for complete search history.

(56) References Cited

U.S. PATENT DOCUMENTS

| | | | |
|---|---|---|---|
| 6,231,013 B1 | 5/2001 | Jaenker | |
| 6,419,187 B1 | 7/2002 | Buter et al. | |
| 6,481,667 B1 | 11/2002 | Ho | |
| 6,769,873 B2 | 8/2004 | Beauchamp et al. | |
| 7,017,421 B2 | 3/2006 | Kehlenbach | |
| 2007/0128025 A1 | 6/2007 | Driver | |

FOREIGN PATENT DOCUMENTS

| | | |
|---|---|---|
| DE | 10126918 | 12/2002 |
| DE | 10126919 | 12/2002 |
| WO | WO0041501 | 7/2000 |
| WO | WO 2004/074681 | 9/2004 |
| WO | WO2004088130 | 10/2004 |
| WO | WO 2004/099608 | 11/2004 |
| WO | WO 2005/111414 | 11/2005 |

OTHER PUBLICATIONS

Denmark Office Action dated Nov. 3, 2009 with International Search Report dated Oct. 29, 2009.

*Primary Examiner* — Edward Look
*Assistant Examiner* — Dwayne J White
(74) *Attorney, Agent, or Firm* — Cohen Pontani Lieberman & Pavane LLP

(57) ABSTRACT

A wind turbine blade comprises a main blade body and trailing edge section movably connected to the main blade body, and an actuator structure internally within the blade. The actuator interconnects the trailing edge section and the main blade body, and it comprises a stack of a plurality of piezoelectric elements, so that the stack of piezoelectric elements is capable of operating as a linear actuator. The actuator structure is arranged such that it is capable of causing the trailing edge section to move or deform relative to the main blade body in response to aerodynamic loads on the blade. The actuator structure is controllable by a control system applying a voltage to the stack of piezoelectric elements in response to, e.g., detected wind or load characteristics.

18 Claims, 3 Drawing Sheets

WIND TURBINE BLADE COMPRISING A TRAILING EDGE FLAP AND A PIEZOELECTRIC ACTUATOR

RELATED APPLICATIONS

This application claims priority from U.S. Provisional Patent Application Ser. No. 61/163,663 which was filed on Mar. 26, 2009 and Denmark Patent Application Number PA 2009 00420 filed Mar. 26, 2009, the entire content of which are incorporated by reference.

FIELD OF THE INVENTION

The present invention relates to wind turbine blades, notably wind turbine blades with displaceable trailing edge sections, also referred to as flaps, useful for altering the aerodynamic profile of the blade and thereby influencing the lift and drag forces on the overall blade structure. In particular, the invention relates to an actuator structure for causing the trailing edge section of a blade to move relative to a main blade portion, the actuator structure comprising a stack of piezoelectric elements.

BACKGROUND OF THE INVENTION

Trailing edge flaps are known to influence the aerodynamic characteristics of wind turbine blades. WO 2004/088130 (Forskningscenter Risø, Bak et al.) discloses a wind turbine blade comprising one or more shape deformable trailing edge airfoil sections comprising actuator means for providing shape changes in the shape deformable trailing airfoil sections. WO 2004/088130 discloses the use of 'smart materials' and mechanical actuators integrated in a deformable materiel changing the outer geometry in the leading and trailing edge region and thereby changing the blade section aerodynamic forces. Such 'smart materials' are said to deform once a voltage is applied to them. Preferred materials are said to include: shape memory alloys, piezoelectric materials, magnetostrictive materials, electrorheological fluids, electrochromic materials, electroactive polymers, chiral materials, conducting polymers, photoactive materials, thick and thin films, optical fibres, tunable dielectrics, self monitoring materials, self assembly materials, self repairing/healing materials, biomaterials, power supplies, power sources, and self powering, multilayer and composite materials and/or 'smart composites'.

SUMMARY OF THE INVENTION

It is an object of embodiments of the invention to provide an embodiment of the basic principle of a piezoelectric-based actuator disclosed in WO 2004/088130, which is accurate, reliable, has a high longevity, responses quickly to control commands or changes in aerodynamic loads, and which is lightning and fatigue resistive.

In a first aspect the present invention provides a wind turbine blade comprising a main blade body and trailing edge section movably connected to the main blade body, the blade further comprising:
  at least one actuator structure internally within the blade, the actuator structure being arranged such that it interconnects the trailing edge section and the main blade body, the actuator structure comprising a stack of a plurality of piezoelectric elements, so that the stack of piezoelectric elements is capable of operating as a linear actuator;
  the actuator structure being arranged such that it is capable of causing the trailing edge section to move or deform relative to the main blade body.

The actuator structure may be controllable by voltage applied, e.g. via electrodes, to the stack of piezoelectric elements. It has been found that the use of a stack of piezoelectric elements renders the actuator structure reliable, stable and fatigue resistant. Moreover, it is easily controllable, e.g. in response to an applied voltage. The control of the actuating structure may conveniently be achieved by means of a control system, which applies voltage to the piezoelectric elements, for example in response to changes in the aerodynamic loads on the blade, absolute or relative wind velocity, turbulence, rotor rpm, desired power output or other parameters.

Though the term 'piezoelectric elements' is consistently used herein, it should be understood that the piezoelectric elements may include or be substituted by any of the following elements or materials, whereby the effects and advantages of the invention are also achieved: shape memory alloys, piezoelectric materials, magnetostrictive materials, electrorheological fluids, electrochromic materials, electroactive polymers, chiral materials, conducting polymers, photoactive materials, thick and thin films, optical fibres, tunable dielectrics, self monitoring materials, self assembly materials, self repairing/healing materials, biomaterials, power supplies, power sources, and self powering, multilayer and composite materials and/or 'smart composites'.

The invention also provides a wind turbine, in particular a horizontal axis wind turbine, comprising one or more blades according to the first aspect of the invention. In embodiments, in which the blade comprises electrodes in contact with the piezoelectric elements, the wind turbine preferably comprises a control system for controlling an activation voltage applied to the stack of piezoelectric elements through the electrodes, so as to thereby control the actuator structure. The control system may comprise a wind velocity meter and/or a load meter for measuring loads on the at least one blade, so as to allow the control system to control the at least actuator structure in response to the wind velocity and/or the load on the blade.

The voltage for controlling the piezoelectric elements may be provided by means of one or more electrodes arranged in contact with the piezoelectric elements. For example, a control system may be provided for controlling an activation voltage applied to the stack of piezoelectric elements through said electrodes, so as to thereby control the actuator structure. The control system may control the stack of piezoelectric elements and hence the actuator structure in response to external input, e.g. a wind velocity measurement or blade load measured e.g. as a pressure on the surface of the blade, by means of one or more torque sensors at the root of the blade or by means of one or more strain gauges at the surface of the blade. The control of the actuator structure may also or alternatively be performed in response to a desired power output or a turbulence degree of the wind field. The control may be performed in response to instant measurements of wind velocity, turbulence, load, etc. or it may be performed in response to averaged data, e.g. on the basis of data sampled over a time span of e.g. two to five seconds up to 24 hours.

In one convenient configuration of the stack of piezoelectric elements, neighboring piezoelectric elements are arranged in alternate poling directions, whereby the electrodes may be arranged between neighboring piezoelectric elements, which share common electrodes as they both are in contact with the same electrode. This configuration safes space and costs. However, other configurations are possible, in which neighboring electrodes are arranged with unidirectional poling directions.

In order to avoid the stack of piezoelectric elements to enter a tensile stress condition due to aerodynamic load effects on the main blade body or trailing edge section, the stack of piezoelectric elements may be kept under a compressive load by a tensioning structure. In particular, an alternating wind load on the trailing edge section, i.e. flap, may cause the stack of piezoelectric elements to enter the tensile stress condition, however this risk is avoided by keeping the elements under compressive load. The tensioning structure may comprise mechanical tensioning elements for providing the required compressive load to the stack.

With a view to protecting the stack of piezoelectric elements against lightning effects or other non-desirable or non-controllable electrical effects, the actuator structure is preferably electrically insulated from the surface of the blade. For example, the actuator structure may comprise electrically insulating elements at both ends of the stack of piezoelectric elements, thereby providing electric insulation between the piezoelectric elements and the control system on the one hand and their surroundings on the other hand. Optionally, a circumferential insulation element or layer may be provided around the stack of piezoelectric elements as well to provide further protection.

The insulating elements or layers may e.g. comprise a ceramic material, a plastics or polymeric material, wood, or a composite material including e.g. one or more of the aforementioned materials. They should have a thickness, which is sufficient to sustain a lightning attack.

In one embodiment of the present invention, the trailing edge section is pivotally connected to the main blade body at an attachment point located between an upper and a lower skin of the blade. A first end of the actuator structure is preferably connected to the main blade body, preferably at a pivot joint, and a second end of the actuator, which is opposite to said first end, is preferably connected the trailing edge section, preferably also at a pivot joint. The attachment point of the second end of the actuator structure and the trailing edge section is preferably at a point distant from the attachment point of the trailing edge section itself to the main blade section. In this way, a moment can be applied to the trailing edge section.

The first end of the actuator structure, which is connected to the main blade section may conveniently be connected to a spar in the main blade section. That end of the actuator structure, which is directly or indirectly connected to the trailing edge section may be connected to a lever which acts as a fulcrum, such that a moment amplification is obtained.

A plurality of actuator structures may be provided. For example, actuator structures may, in a chordwise cross section of the blade, be provided at opposite sides of the pivotal interconnection between the main blade section and the trailing edge section, so as to thereby achieve that the two actuator sections provide a common moment to the trailing edge section around the pivot point. In other embodiments, a plurality of actuator structures may be provided for controlling a plurality of separate flaps (i.e. trailing edge sections) arranged next to each other or at mutual distances in the spanwise direction of the blade. In such embodiments, the separate trailing edge sections may be individually controllable, or they may be controlled by control commands common to all trailing edge sections.

A force sensor may be comprised within the stack of piezoelectric elements. For example, one piezoelectric element may be configured as a dummy, of which an electric signal may be tapped to measure the dynamic force that passes there through by quantifying the voltage or the charge that arises in it.

Further, the actuator structure may comprise a displacement sensor for detecting the displacement of the actuator structure. For example, the displacement sensor may be embodied by a contact or non-contact, e.g. optical displacement sensor adjacent to or in the vicinity of the actuator structure.

The output signals produced by the force sensor and/or displacement sensor may be passed to the control system for controlling the movement of the trailing edge section, so as to allow the control system to use the signals for control purposes. In one embodiment, the control system may use the detected force to deflect the trailing edge section further, if the detected force is below a certain value, indicating low load, or analogously to reduce deflection if the force passing through the actuator structure is above a threshold value. Also, a measured displacement of the actuator structure may e.g. be used by the control system to pass a further signal onto a system for controlling the pitch of the blade. For example, in case deflection is already at its maximum in a given situation, where more thrust on the blades of a wind turbine is desirable, the pitch of the blade may be reduced to achieve the desired thrust or load increase. Alternatively, if the actuator displacement is not at its maximum, a general control system of the wind turbine may be configured to decide if (a) pitch is to be decreased, or (b) the trailing edge section is to be deflected further, or (c) changes in the power-generating control are to be performed, e.g. a change of the level of magnetization of the rotor of a synchronous generator of the wind turbine. Such decisions may e.g. be based on wind velocities, turbulence levels, blade loads, rotor rpm, generated power, etc.

Generally, the control of the actuator structure of the trailing edge section may preferably be coupled to or integrated with other control elements of the wind turbine.

DETAILED DESCRIPTION OF THE PRESENTLY PREFERRED EMBODIMENTS

Figure 1:
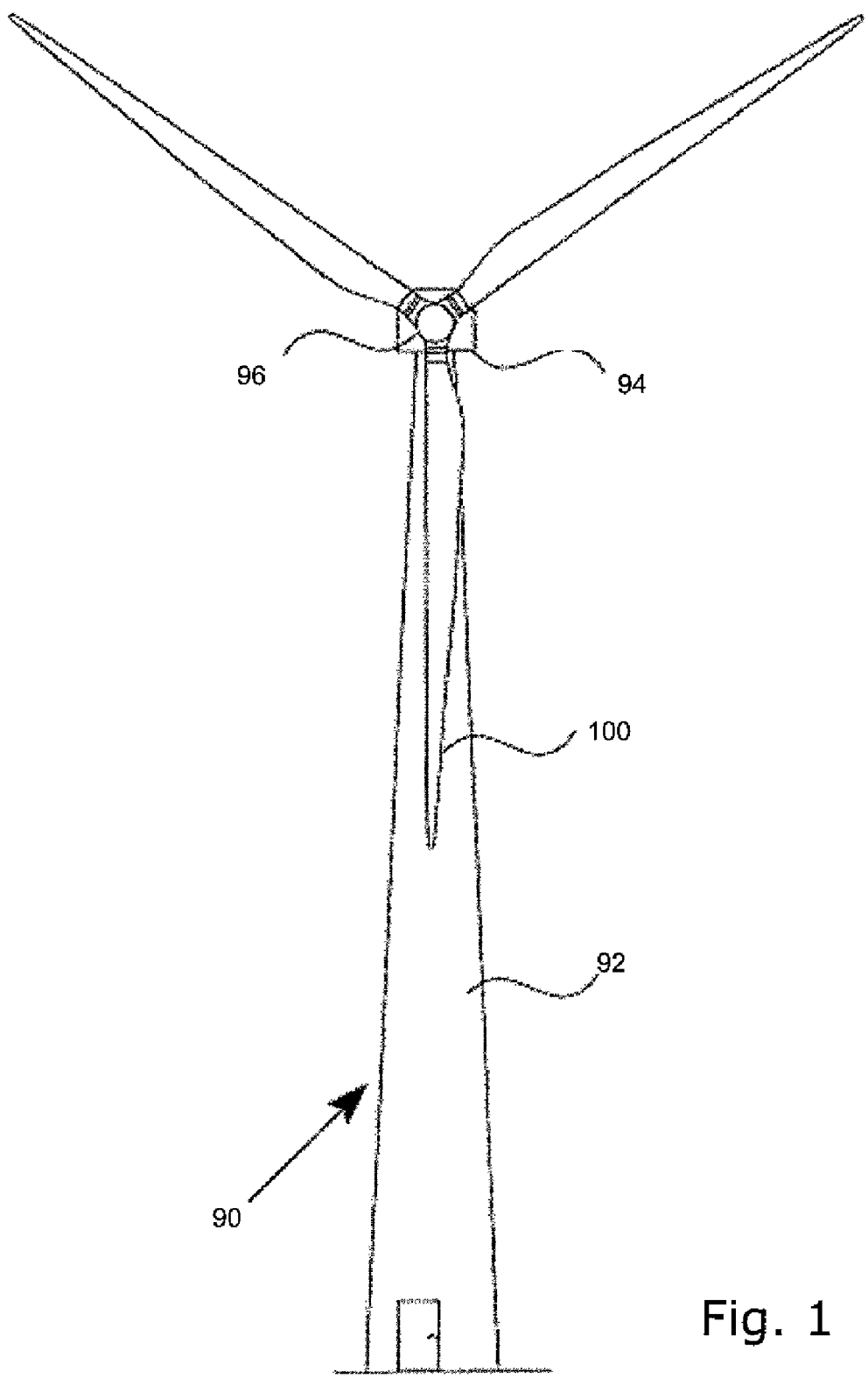
FIG. 1 generally illustrates a wind turbine.

As shown in FIG. 1, a wind turbine 90 comprises a tower 92, a nacelle 94 at the tower top, the nacelle housing machine components, such as gearbox, generator etc. (not shown). At an upwind end of the nacelle, a hub 96 supports a plurality of wind turbine blades 100.

Figure 2:
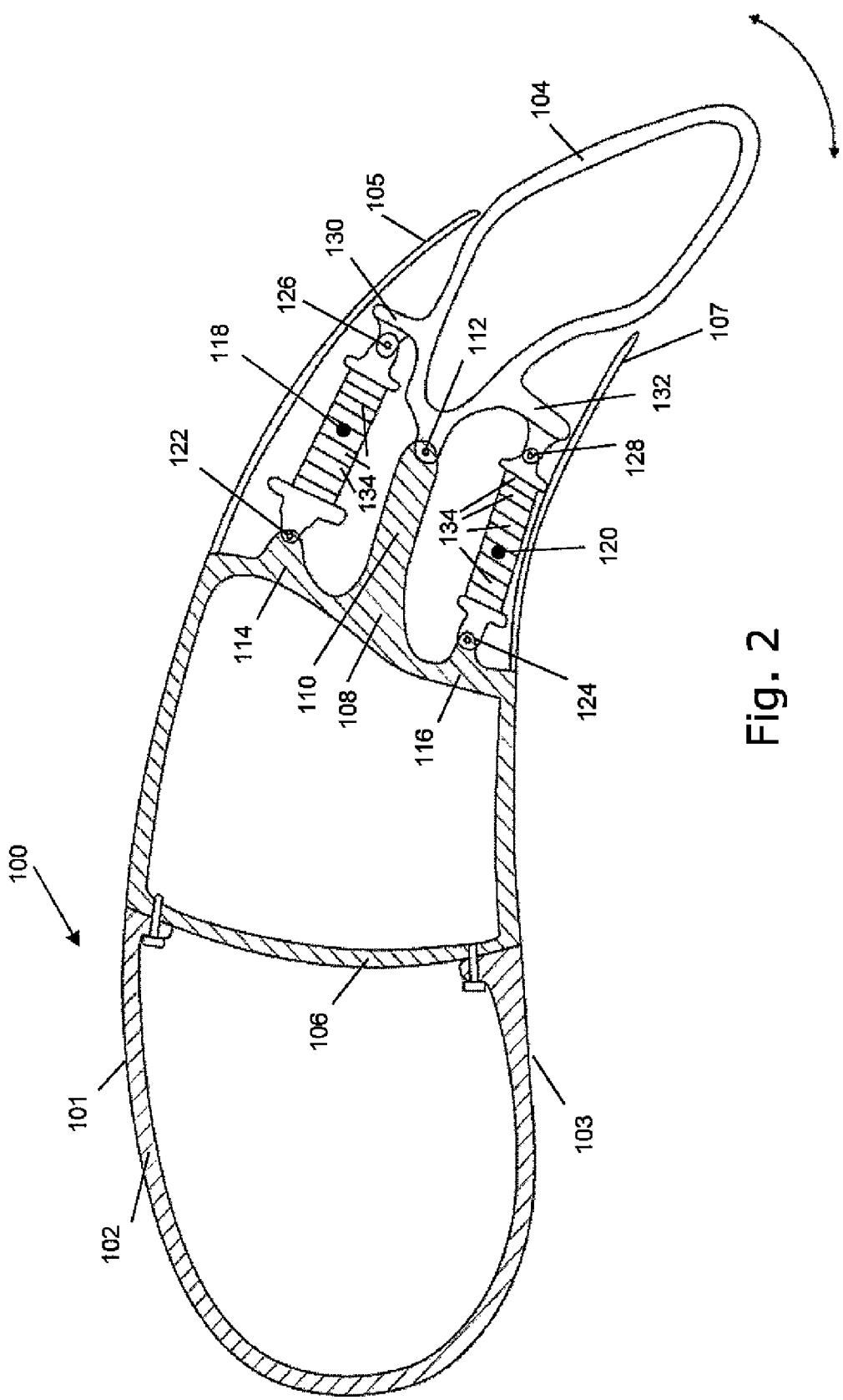
FIG. 2 shows a cross section of a wind turbine blade according to the present invention.

FIG. 2 shows a cross section of a wind turbine blade 100 according to the present invention. The blade comprises a main blade body 102 and a trailing edge section 104. The blade 100 comprises upper and lower skins 101 and 103. Trailing sections 105 and 107 of the main blade section may be flexible, elastic or springy, made e.g. from a suitable laminate. The main blade body 102 comprises spars 106 and 108. At a first projection 110 of spar 108, the trailing edge section 104 is movably connected to the main blade body at pivot 112. At second and third projections 114 and 116 of spar 108, respective first ends of first and second actuator structures 118 and 120 are attached at pivots 122 and 124. Opposite second ends of the actuators 118 and 120 are attached at further pivots 126 and 128 to fulcrums 130 and 132 of the trailing edge section 104.

Each of the actuator structures 118 and 120 comprises a stack of a plurality of piezoelectric elements 134, such as rings or circular plates of piezoelectric material. The stack of piezoelectric elements 134 and hence the actuator structures 118 and 120 are arranged so as to allow the actuator structures to operate as linear actuators for causing the trailing edge section 104 to move, deform or deflect relative to the main blade section 102.

Displacement of the actuators 118 and 120 results in deflection of the trailing edge section 102 relative to the main blade section 102, as the trailing edge section 104 (flap) pivots around pivot joint 112. Operation of the actuators is appropriately controlled by a control system, which may e.g. cause the upper actuator 118 to extend its length and the lower actuator 120 to simultaneously reduce its length for deflection of the trailing edge section 104. Likewise, for reducing deflection of the trailing edge section 104, the upper actuator 118 may be operated to reduce its length, and the lower actuator 120 may be operated to increase its length. It will be appreciated that, in the embodiment shown in FIG. 2, the actuator structures 118 and 120 co-operate to provide a moment around the pivot joint 112, which is displaced from the points of attack at 126 and 128, with the fulcrums 130 and 132 acting as force amplifiers.

Figure 3:
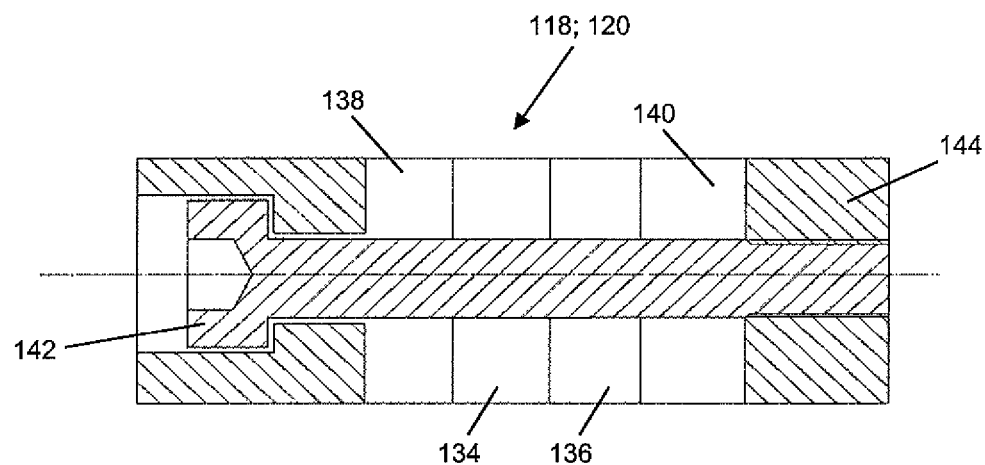
FIG. 3 shows a first embodiment of an actuator structure for a wind turbine blade of the present invention.

FIG. 3 shows a first embodiment of the actuator structure 118 and 120 in more detail. In addition to the stack of piezoelectric elements 134, the actuator structure shown comprises a force sensor 136 in the form of a dummy piezoelectric element, of which an electric signal may be tapped to measure the dynamic force that passes through in series, by quantifying the voltage or the charge that arises in it. Adjacent the stack of piezoelectric elements are insulating rings 138 and 140 of a ceramic material for protecting the actuators from lightning current. The stack of piezoelectric elements and the force sensor is held together under compressive load by a bolt 142 and a nut 144 in order to avoid the stack of piezoelectric elements to enter a tensile stress condition under the presence of an alternating wind load on the trailing edge section 104. The bolt head is optionally received in a housing element 144. Electrodes (not shown) for providing an operating voltage, charge or current to the stack of piezoelectric elements are connected to the stack of piezoelectric elements.

Figure 4:
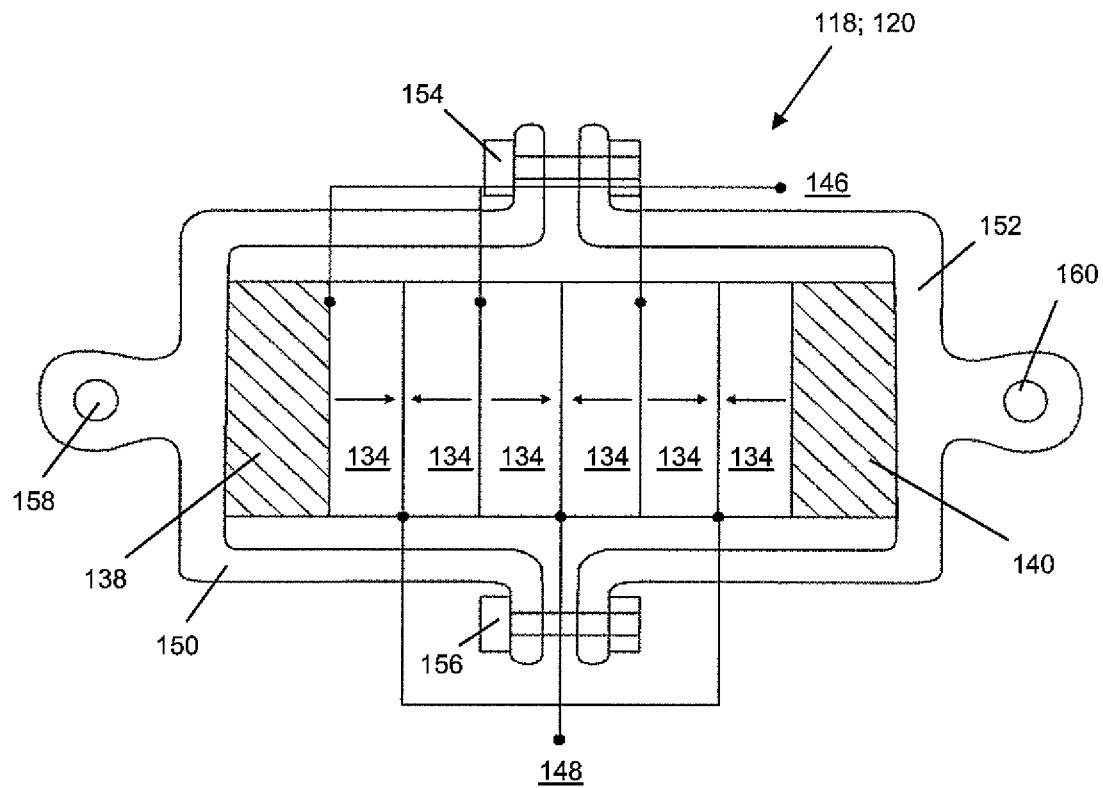
FIG. 4 shows a second embodiment of an actuator structure for a wind turbine blade of the present invention.

FIG. 4 illustrates a second embodiment of the actuator structure 118 and 120 generally depicted in FIG. 2. Though the embodiment of FIG. 4 in its implementation differs from the embodiment of FIG. 3, like elements are given the same reference numbers in FIG. 4 as in FIG. 3. The actuator 118, 120 comprises a stack of piezoelectric elements 134, between which are arranged first activation electrodes 146 and second activation electrodes 148. Neighbouring piezoelectric elements share common electrodes 146 and 148, with the piezoelectric elements being arranged with their poling directions as indicated by arrows in FIG. 4. A force sensor (not shown) may optionally be included in the stack of piezoelectric elements 134. At the respective ends of the stack of piezoelectric elements, insulating rings of a ceramic material are provided for lightning protection.

The stack of piezoelectric elements 134 and the insulating rings 138, 140 are housed in U-shaped housing halves 150 and 152, which are held together by bolds 154 and 156, whereby the stack of piezoelectric elements is kept under compressive load in order to avoid the stack of piezoelectric elements to enter a tensile stress condition under the presence of an alternating wind load on the trailing edge section 104.

The housing halves 150 and 152 form revolute joints 158 and 160 for attachment to the spar 108 of the main blade section and to the trailing edge section, respectively.

In addition to the elements shown in the drawings, a displacement sensor may be provided for measuring or determining the displacement of the actuators 118, 120.

In the embodiments shown herein, the stack 134 of piezoelectric elements is preferably controlled via electrodes, e.g. electrodes 146 and 148 as shown in the embodiment of FIG. 4, to which a charge or current is provided in response to control commands generated in a control system (not shown).

The invention claimed is:

1. A wind turbine blade comprising a main blade body and trailing edge section movably connected to the main blade body, the blade further comprising:
   at least one actuator structure internally within the blade, the actuator structure being arranged such that it interconnects the trailing edge section and the main blade body, the actuator structure comprising a stack of a plurality of piezoelectric elements, so that the stack of piezoelectric elements is capable of operating as a linear actuator, wherein the actuator structure is electrically insulated from skins of the main blade section and the trailing edge section;
   the actuator structure being arranged such that it is capable of causing the trailing edge section to move or deform relative to the main blade body;
   wherein the actuator structure comprises electrically insulating elements at both ends of the stack of piezoelectric elements.

2. The wind turbine blade according to claim 1, further comprising electrodes in contact with the piezoelectric elements, and a control system for controlling an activation voltage applied to the stack of piezoelectric elements through said electrodes, so as to thereby control the actuator structure.

3. The wind turbine according to claim 2, wherein the piezoelectric elements are arranged in alternate poling directions, and wherein the electrodes are arranged between neighboring piezoelectric elements, which share common electrodes.

4. The wind turbine blade according to according to claim 1, further comprising a tensioning structure for keeping the stack of piezoelectric elements under a compressive load.

5. The wind turbine blade according to claim 1, wherein the insulating elements comprise a ceramic material, a polymeric material or a composite material.

6. The wind turbine blade according to claim 1, wherein the insulating elements have a thickness, which is sufficient to sustain a lightning attack.

7. The wind turbine blade according to claim 1, wherein the trailing edge section is pivotally connected to the main blade body at an attachment point located between an upper and a lower skin of the blade, and wherein a first end of the actuator structure is connected to the main blade body, and a second end of the actuator, which is opposite to said first end, is connected the trailing edge section at a point distant from said attachment point of the trailing edge section.

8. The wind turbine blade according to claim 1, wherein said at least one actuator structure comprises a plurality of actuator structures.

9. The wind turbine blade according to claim 7, wherein the plurality of actuator structures comprises a first and a second actuator structure arranged at respective of said attachment point of the trailing edge section, so as to allow them to apply a moment to the trailing edge section.

10. The wind turbine blade according to claim 1, further comprising a force sensor within the stack of piezoelectric elements.

11. The wind turbine blade according to claim 10, wherein the force sensor comprises a dummy piezoelectric element.

12. The wind turbine blade according to claim 1, wherein the actuator structure further comprises a displacement sensor for detecting the displacement of the actuator structure.

13. The wind turbine blade according to claim 1, wherein the trailing edge section forms a trailing edge flap.

14. A wind turbine comprising at least one wind turbine blade comprising a main blade body and trailing edge section movably connected to the main blade body, the blade further comprising:
- at least one actuator structure internally within the blade, the actuator structure being arranged such that it interconnects the trailing edge section and the main blade body, the actuator structure comprising a stack of a plurality of piezoelectric elements, so that the stack of piezoelectric elements is capable of operating as a linear actuator, wherein the actuator structure is electrically insulated from skins of the main blade section and the trailing edge section;
- the actuator structure being arranged such that it is capable of causing the trailing edge section to move or deform relative to the main blade body;
- wherein the actuator structure comprises electrically insulating elements at both ends of the stack of piezoelectric elements.

15. The wind turbine according to claim 14, wherein the blade further comprises electrodes in contact with the piezoelectric elements, and wherein the wind turbine comprises a control system for controlling an activation voltage applied to the stack of piezoelectric elements through said electrodes, so as to thereby control the actuator structure.

16. The wind turbine according to claim 15, wherein the control system further comprises a wind velocity meter and/or a load meter for measuring loads on the at least one blade, the control system being configured to control the at least actuator structure in response to the instant wind velocity and/or the instant load on the blades.

17. A wind turbine blade comprising a main blade body and trailing edge section movably connected to the main blade body, the blade further comprising:
- at least one actuator structure internally within the blade, the actuator structure being arranged such that it interconnects the trailing edge section and the main blade body, the actuator structure comprising a stack of a plurality of piezoelectric elements, so that the stack of piezoelectric elements is capable of operating as a linear actuator, wherein the actuator structure is electrically insulated from skins of the main blade section and the trailing edge section;
- the actuator structure being arranged such that it is capable of causing the trailing edge section to move or deform relative to the main blade body;
- wherein the trailing edge section is pivotally connected to the main blade body at an attachment point located between an upper and a lower skin of the blade,
- wherein a first end of the actuator structure is connected to the main blade body, and
- wherein a second end of the actuator, which is opposite to said first end, is connected the trailing edge section at a point distant from said attachment point of the trailing edge section.

18. A wind turbine comprising at least one wind turbine blade, the wind turbine blade comprising a main blade body and trailing edge section movably connected to the main blade body;
- at least one actuator structure internally within the blade, the actuator structure being arranged such that it interconnects the trailing edge section and the main blade body, the actuator structure comprising a stack of a plurality of piezoelectric elements, so that the stack of piezoelectric elements is capable of operating as a linear actuator, wherein the actuator structure is electrically insulated from skins of the main blade section and the trailing edge section;
- the actuator structure being arranged such that it is capable of causing the trailing edge section to move or deform relative to the main blade body;
- wherein the trailing edge section is pivotally connected to the main blade body at an attachment point located between an upper and a lower skin of the blade,
- wherein a first end of the actuator structure is connected to the main blade body, and
- wherein a second end of the actuator, which is opposite to said first end, is connected the trailing edge section at a point distant from said attachment point of the trailing edge section.

* * * * *